(12) United States Patent
Nakai

(10) Patent No.: US 7,626,772 B2
(45) Date of Patent: Dec. 1, 2009

(54) OPTICAL SYSTEM AND OPTICAL APPARATUS HAVING THE SAME

(75) Inventor: Takehiko Nakai, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/204,161

(22) Filed: Sep. 4, 2008

(65) Prior Publication Data

US 2009/0135503 A1 May 28, 2009

(30) Foreign Application Priority Data

Nov. 28, 2007 (JP) .............................. 2007-306835

(51) Int. Cl.
*G02B 9/04* (2006.01)
(52) U.S. Cl. ....................................... 359/793
(58) Field of Classification Search ................. 359/793
See application file for complete search history.

(56) References Cited

FOREIGN PATENT DOCUMENTS

| JP | 06-003501 A | 1/1994 |
|---|---|---|
| JP | 2004-302112 A | 10/2004 |
| JP | 2005-157119 A | 6/2005 |
| JP | 2006-010831 A | 1/2006 |

OTHER PUBLICATIONS

Applied Optics, vol. 25, No. 24, pp. 4562-4567 (1986).

*Primary Examiner*—Darryl J Collins
(74) *Attorney, Agent, or Firm*—Canon U.S.A., Inc. I.P. Division

(57) ABSTRACT

An optical system includes a first lens with a functional film having film hardness of equal to or less than H formed on at least on one surface thereof, and a second lens located opposite the surface with the functional film of the first lens and having a diameter larger than that of the surface with the functional film, wherein the first lens and the second lens are in marginal contact with each other.

20 Claims, 5 Drawing Sheets

OPTICAL SYSTEM AND OPTICAL APPARATUS HAVING THE SAME

BACKGROUND OF THE INVENTION

1. Field of the Invention

The present invention relates to an optical system, which is suitable for use in an optical apparatus, such as a silver-halide film camera, a digital still camera, a video camera, a digital video camera, a telescope, binoculars, a projector, and a copying machine.

2. Description of the Related Art

Conventionally, in an optical element (lens) made of a transmissive medium, such as glass or plastic, an increase of surface reflection often causes flare and ghost and reduces a transmittance thereof. Therefore, the optical element (lens) is coated with an antireflection coating made of a thin film made of dielectric film on the surface thereof.

It is required that the antireflection coating has an excellent antireflection effect even when a range of incident angles of light fluxes incident on the optical element is wide.

In order to obtain a high antireflection effect in a wide incident angle range, a difference in refractive index between air and a layer, and between layers must be low. Accordingly, it is effective to use a functional film having a refractive index lower than that of the dielectric film.

As the functional film having a low refractive index, a porous film in which fine cavities are dispersed in a layer (in transparent material) and a film including fine particles (porous optical material) are discussed in Japanese Patent Application Laid-Open No. 6-003501 and Japanese Patent Application Laid-Open No. 2004-302112.

In addition, a functional film having a fine concavo-convex structure which is less than a wavelength of visible light and having an effect of antireflection is discussed in Applied Optics, Vol. 25, No. 24, pp 4562 to 4567 (1986).

In order to incorporate and hold a lens in a lens barrel, the lens is incorporated in the lens barrel and is fixed via a holding member (presser ring). Further, a holding member is used to hold the lens, while a relative clearance between adjacent lenses is maintained via a spacer.

In this case, in order to shorten the length of the entire optical system and to improve the assembly accuracy, a method (hereinafter, referred to as marginal contact) can be used in which a lens is directly made contact with an adjacent lens at the periphery thereof and the state is held in a lens barrel.

Normally, the accuracy of processing a barrel and a spacer made of a metal or a molding resin is from several microns to several ten microns. Compared with this, the accuracy of processing a curvature of a lens surface needs accuracy of sub micron order. Accordingly, a marginal contact method is extremely effective when the accuracy of clearance between two opposing lenses and the accuracy of decentering are highly required, and can be widely applied to an optical system where high accuracy is required.

Further, some lenses having high sensitivity with respect to the decentering of a lens is assembled by fixing it after performing the decentering adjustment in a lens barrel.

FIGS. 8A and 8B are diagrams illustrating a method for fixing two lenses 1 and 2 in marginal contact with each other in a lens barrel 3 after performing a decentering adjustment to an optical axis 9, and then fixing it.

FIG. 8A is a diagram illustrating a state of performing a rotation adjustment of the two lenses 1 and 2 in marginal contact with each other as indicated by an arrow in a plane orthogonal to the optical axis 9 to perform aligning.

FIG. 8B is a diagram illustrating a state of performing a shift adjustment of the two lenses 1 and 2 in marginal contact with each other as indicated by an arrow in a plane orthogonal to the optical axis 9 to perform aligning.

The functional film with a low refractive index for obtaining an excellent antireflection effect in the range of a wide incident angle discussed in Japanese Patent Application Laid-Open No. 6-003501, Japanese Patent Application Laid-Open No. 2004-302112, and Applied Optics, Vol. 25, No. 24, pp 4562 to 4567 (1986) has extremely low film hardness compared with a film having a low refractive index made of a dielectric film.

Thus, when two lenses have marginal contact with each other to shorten the whole length of an optical system and to obtain high assembly accuracy, if a lens surface with a functional film thereon contacts a surface of another lens, the functional film may be damaged at a contact portion and the antireflection effect may be reduced.

Further, a part of a damaged functional film may be scattered on surfaces of the lenses and it may cause a deterioration of optical performance.

Accordingly, it has come to a significant purpose to obtain an optical system that a functional film is not damaged when a lens with a functional film thereon has marginal contact with another lens and is incorporated in a lens barrel.

SUMMARY OF THE INVENTION

The present invention is directed to an optical system in which a lens with a functional film of low film hardness thereon can have marginal contact with another lens without being damaged, and can be easily assembled with high assembly accuracy.

According to an aspect of the present invention, an optical system includes a first lens with a functional film having film hardness of equal to or less than H formed on at least on one surface thereof, and a second lens located opposite the surface with the functional film of the first lens and having a diameter larger than that of the surface with the functional film, wherein the first lens and the second lens are in marginal contact with each other.

According to another aspect of the present invention, an optical system includes two lenses that are in marginal contact with each other, wherein a surface of one of the two lenses which is in marginal contact with a surface of the other lens has a functional film having low film hardness, such as equal to or less than H according to a scratch hardness standard specified in ISO/DIN 15184.

According to yet another aspect of the present invention, a marginal contact surface of a lens which is in marginal contact with a surface of another lens with a functional film thereon has a diameter (lens diameter) larger than that of the surface with the functional film thereon.

According to further yet another aspect of the present invention, the functional film includes an antireflection function in a visible light range (wavelength of 400 nm to 700 nm).

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DETAILED DESCRIPTION OF THE EMBODIMENTS

Various exemplary embodiments, features, and aspects of the invention will be described in detail below with reference to the drawings.

First Exemplary Embodiment

Figure 1:
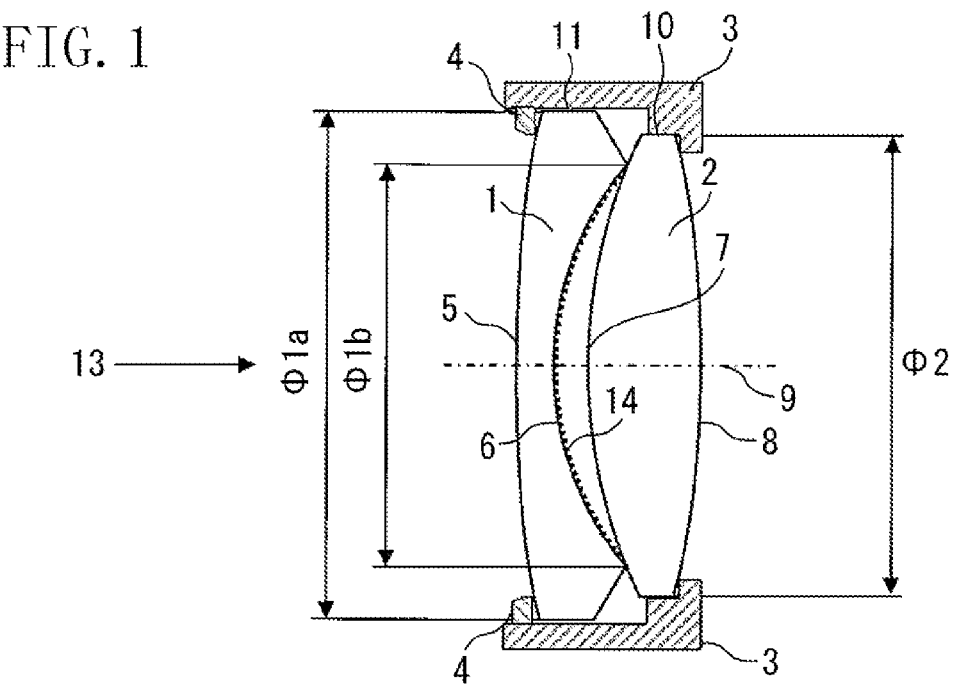
FIG. 1 is a cross-sectional view illustrating an arrangement of an optical system according to a first exemplary embodiment of the present invention.

FIG. 1 is a cross-sectional view of an optical system according to a first exemplary embodiment of the present invention. FIG. 1 illustrates a state in which a first lens 1 and a second lens 2 are incorporated in a lens barrel 3. In a practical optical system, further lenses are incorporated in the lens barrel 3. The optical system has a function in which a plurality of lens units are moved in the lens barrel 3 corresponding to zooming. FIG. 1 illustrates an arrangement including a minimum number of lenses and a lens barrel.

The first lens 1 is a meniscus-shaped negative lens including a convex-shaped first surface 5 and a concave-shaped second surface 6. The second lens 2 is a positive lens including a convex-shaped first surface 7 and a convex-shaped second surface 8. A diameter (outer diameter) of the first surface 5 of the first lens 1 is represented by $\Phi 1a$, and a diameter (inner diameter) of the second surface 6 of the first lens 1 is represented by $\Phi 1b$, where an inequality $\Phi 1b < \Phi 1a$ is satisfied. Both of the diameters of the first surface 7 of the second lens 2 and the second surface 8 thereof are represented by $\Phi 2$.

The concave-shaped second surface (lens surface) 6 of the first lens 1 has a functional film 14 having low film hardness and an antireflection function. The functional film 14 has film hardness of equal to or less than H specified in ISO/DIN 15184.

Herein, a functional film refers to, for example, a porous film where fine cavities are dispersed in a layer (in transparent material), a film in which fine particles are arranged, or a film having fine relief shape (fine concavo-convex shape).

Figure 2:
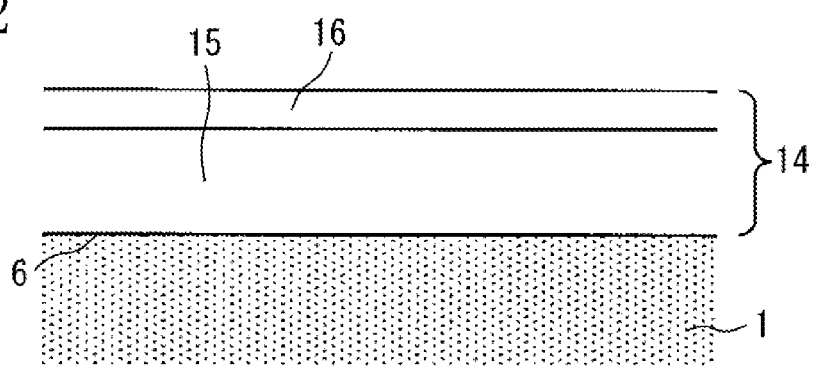
FIG. 2 is a schematic view illustrating an arrangement of a functional film according to an exemplary embodiment of the present invention.

As illustrated in FIG. 2, the functional film 14 includes, for example, a thin film portion 15 and a fine structure portion 16 formed on the lens surface 6 of the first lens 1. The thin film portion 15 includes one or more thin film layers. The thin film portion 15 includes a precise film without a fine structure, produced by vacuum vapor deposition, sputtering deposition, a spin coating method of sol-gel liquid, or the like.

On the thin film portion 15, the fine structure portion 16 is laminated. The fine structure portion 16 acts as a layer having a refractive index lower than that of the thin film portion 15 or the material of the first lens 1.

The fine structure portion 16 includes a fine structure having a periodic structure equal to or less than ½ (e.g., 200 nm or shorter) of the shortest wavelength (e.g., 400 nm) of a wavelength in use.

Generally, when a fine structure is formed at a boundary surface between air and a medium, a structure having less than a wavelength does not function as a structure and acts equivalently as a thin film having a refractive index corresponding to the occupancy rate of the air and the medium at the boundary surface. When the fine structure is formed in a conical shape or the like, the fine structure is equivalent to such a film that the refractive index thereof continuously decreases from the medium side toward the air side. Since this structure has no boundary surface that causes a difference in refractive index, good antireflection characteristics is obtained over a wide incident angle.

In the present exemplary embodiment, thus, the functional film 14 having high-performance antireflection characteristics is formed.

Figure 3:
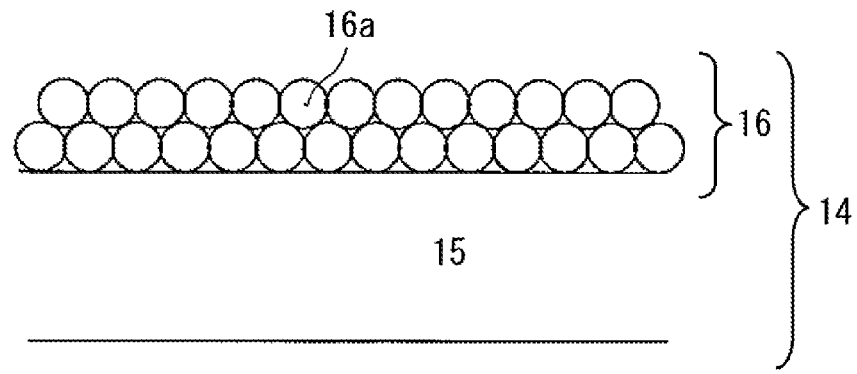
FIG. 3 is a schematic view illustrating an example of a fine structure portion for use in the outermost layer of a functional layer.
Figure 4:
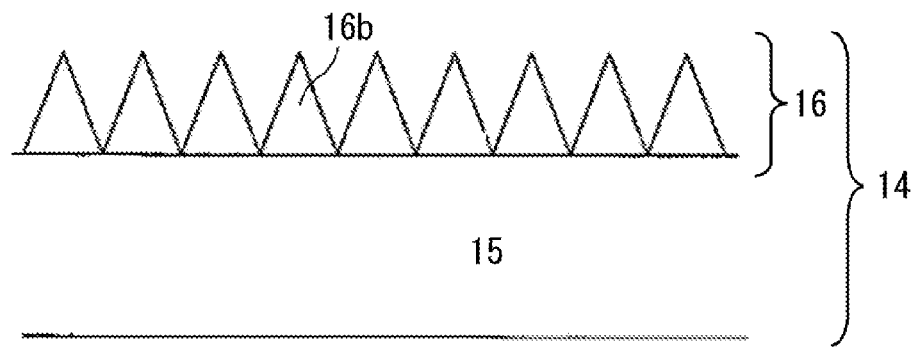
FIG. 4 is a schematic view illustrating another example of a fine structure portion for use in the outermost layer of a functional layer.

Further, as the fine structure portion 16 used in the present exemplary embodiment, the structure, as illustrated in FIG. 3, with fine particles 16a (layer having low refractive index containing fine cavities and particle) can be applied. Furthermore, as illustrated in FIG. 4, a structure with a plurality of fine relief shaped portions 16b, each having a length less than a wavelength in use (e.g., 550 nm), formed on the outermost surface side, can be applied.

Figure 5:
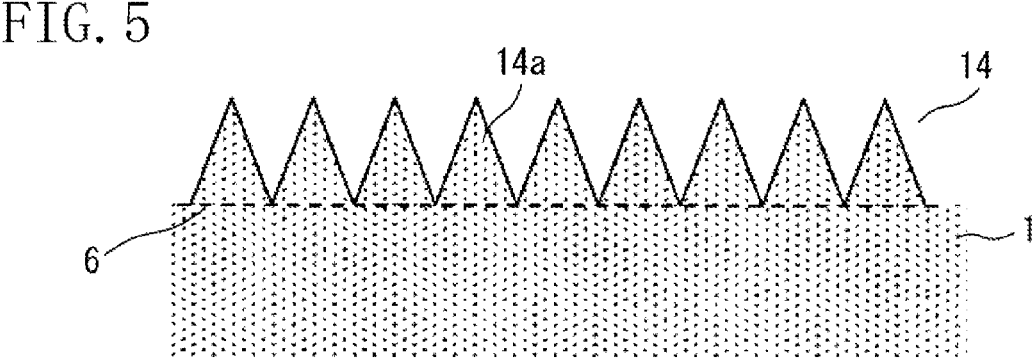
FIG. 5 is a schematic view illustrating an arrangement of a functional film having a fine concavo-convex structure according to an exemplary embodiment of the present invention.

Alternatively, as illustrated in FIG. 5, a fine structure portion 14a can be directly formed on the lens surface 6 as the functional film 14 without the thin film layer 15. In any case, if a functional film of the outermost surface (surface in contact with air) has film hardness of equal to or less than H according to a scratch hardness standard specified in ISO/DIN 15184, an optical system according to an exemplary embodiment of the present invention can be applied. As a method for producing a fine relief shaped structure (fine structure portion) and a low refractive index layer, for example, the following methods can be used.

Herein, the low refractive index layer refers to a layer with a lower refractive index compared with the refractive index of a substrate (lens or thin film layer) on which it is formed. For example, it has a refractive index of 1.35 or lower that is lower than that of $MgF_2$ (refractive index of 1.38) and $SiO_2$ (refractive index of 1.49).

Various types of production methods described below can be used as a method for producing a functional film having high-performance characteristics, including the following:

(1) A production method of transferring a fine relief shape to the surface of a lens by injection molding using a mold having a fine relief shape.

(2) A production method of forming a fine relief shape on the surface of a lens by stacking a lens with a mold, which has a fine concavo-convex structure thereon, via a precursor liquid layer of a radiation curable resin, and then irradiating radioactive rays to cure the precursor liquid layer before demolding.

(3) A production method of forming a layer with arranged fine particles on the outermost surface side (surface side in contact with air) by performing at least one of spin coating and dip coating of a liquid in which fine particles having a size of not more than a wavelength of light (visible light), (e.g., wavelength of 550 nm or lower) are dispersed in a binder.

(4) A production method of forming a porous layer of silica aerogel on the outermost surface.

(5) A production method of forming a refractive index layer, with cavities, on outermost surface side by applying a resin, which includes dispersed different medium, to the surface of a lens and removing the medium from the resin by a treatment.

(6) A production method of forming a fine structure layer on the outermost surface side by performing hot water treatment on a multi-component layer formed by performing at least one of spin coating and dip coating of a coating liquid, on the surface of a lens, the liquid containing at least one compound selected from among compounds of zirconium, silicon, titanium and zinc, and a compound of aluminum.

In addition to the production methods described above, a production method of achieving a high-performance functional film having low film hardness can be applied to the present invention.

Next, in FIG. 1, an arrangement of an optical system according to a first exemplary embodiment will be described according to a procedure for incorporating the two lenses 1 and 2 into the lens barrel 3.

In the present exemplary embodiment, a lens barrel, which accommodates a lens with a functional film formed thereon and a lens having a diameter larger than that of a surface of the lens with the functional film formed thereon, has a structure in which the lens with the functional film is incorporated into the lens barrel from the direction of the surface opposite the surface with the functional film.

In the optical system illustrated in FIG. 1, the lens barrel 3, the first lens 1, and the second lens 2 are designed so as to incorporate the lenses 2 and 1 in this order into the lens barrel 3 from a direction indicated by an arrow 13.

First, the second lens 2 engages in the lens barrel 3 at an external diameter portion 10, thereby holding a position in a direction perpendicular to the optical axis 9. Then, the second lens 2 slides in a direction parallel to the optical axis 9 to contact the lens barrel 3 at the periphery portion of the second surface 8 of the second lens 2, so that the lens 2 is fixed in the direction of the optical axis 9.

Next, the first lens 1 is incorporated into the lens barrel 3. The first lens 1 slides while engaging at an external diameter portion 11 in the lens barrel 3. The edge portion 12 of the internal diameter $\Phi 1b$ of the second surface 6 of the first lens 1 meets the first surface 7 of the second lens 2. The first lens 1 is thus fixed in the direction of the optical axis 9. Finally, the first lens 1 is held by a presser ring 4 so that each lens is not moved.

In FIG. 1, the internal diameter of the lens barrel 3 is larger than the external diameter of the first lens 1. The first lens 1 can move freely in the range of a difference between the external diameter of the first lens 1 and the internal diameter of the lens barrel 3.

This arrangement allows the edge portion 12 of the second surface 6 of the first lens 1 to contact the opposite first surface 7 of the second lens 2 at the entire surface of the edge portion 12 even if the surface of the lens is decentered. Thus, it is effective when sensitivity for relative decentering of the second surface 6 of the first lens 1 and the first surface 7 of the second lens 2 is high.

In the arrangement of an optical system according to the present exemplary embodiment, the diameter $\Phi 2$ of the first surface 7 of the second lens 2, located opposite the second surface 6, is larger than the internal diameter $\Phi 1b$ of the second surface 6 having the functional film 14.

With the arrangement of the present exemplary embodiment, the second surface 6 having the functional film 14 with low film hardness contacts the second lens 2 only at the edge portion 12 of the internal diameter $\Phi 1b$. Therefore, the first lens 1 can be held without contact with the functional film 14.

In the present exemplary embodiment, the first lens 1 with the functional film 14 thereon is incorporated into the lens barrel 3 from the direction of the surface opposite the second surface 6. This arrangement allows the first lens 1 to be incorporated into the lens barrel 3 while being held with the first surface 5. Thus, the first lens 1 can be incorporated without contact with the functional film 14.

Further, in this case, an antireflection coating having high film hardness (film hardness of not less than H) can be applied to the first surface 5 opposite the second surface 6 with the functional film 14. This significantly improves the incorporating performance of a lens.

Figure 9:
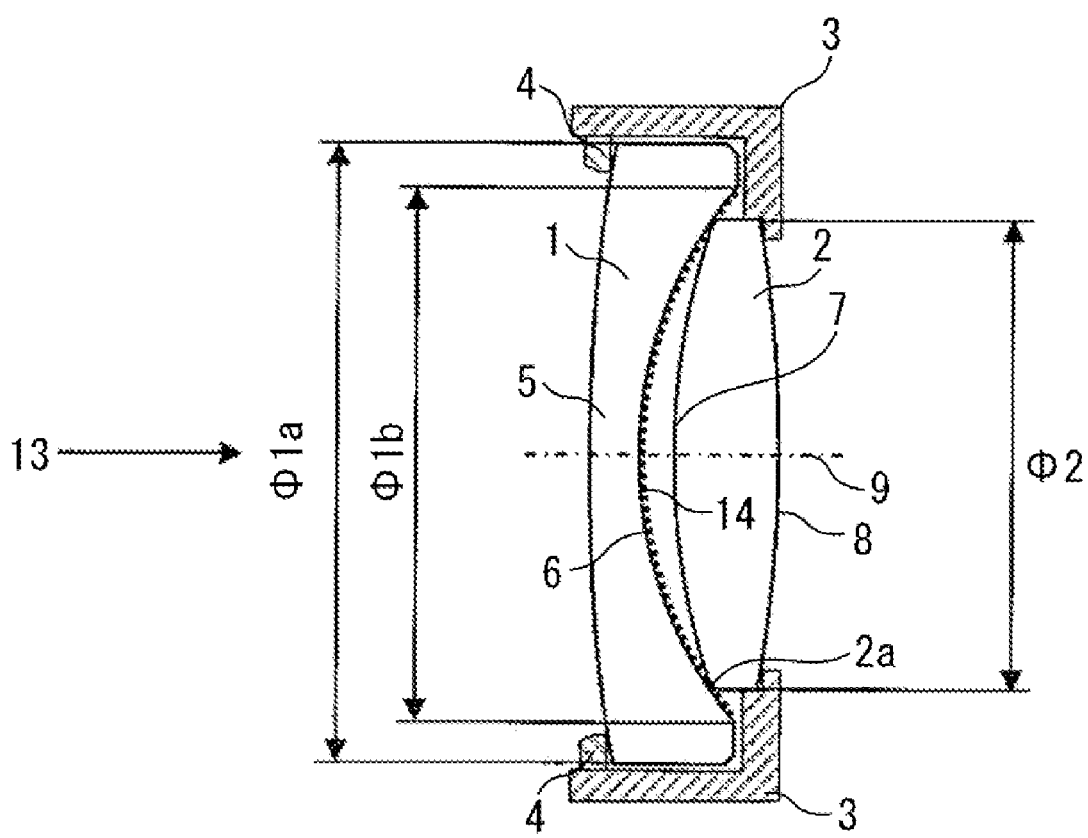
FIG. 9 is a cross-sectional view illustrating an arrangement of a conventional optical system.

A comparative example for the first exemplary embodiment illustrated in FIG. 1 is illustrated in FIG. 9. FIG. 9 has a similar lens arrangement as that in FIG. 1 and illustrates an optical system when the internal diameter $\Phi 1b$ of the second surface 6 of the first lens 1 having the functional film 14 is larger than the diameter $\Phi 2$ of the first surface 7 opposite the first lens 1. In the comparative example illustrated in FIG. 9, the edge portion 2a of the external diameter $\Phi 2$ of the second lens 2 contacts the second surface 6 having the functional film 14. Accordingly, the contact position of the functional film 14 may be broken.

Now, a case where decentering adjustment as described above is performed will be described.

In the arrangement illustrated in FIG. 9, the edge portion 2a of the external diameter $\Phi 2$ of the second lens 2 may be rotated or shifted on the second surface 6 with the functional film 14. Thus, the functional film 14 may be broken increasingly. Then, depending on conditions, dust, such as shavings, appears. Since this dust appears between surfaces at marginal contact, after the decentering adjustment is finished, the dust cannot be removed without removing the lens. Accordingly, productivity is significantly deteriorated. Further, at the broken portion, since the fine structure portion is absent, the desired reflection characteristics are not obtained. Depending on the arrangement, the absence of the fine structure portion which is a layer having a low refractive index may also provide a reflectance higher than that of a normal antireflection coating. This may cause the harmful ghost image.

Further, by breaking a part of the functional film 14, even if the functional film 14 is excellent in environment-resistant characteristics, the environment-resistant characteristics in the broken place are deteriorated. With its broken part as the starting point, the environment-resistant characteristics of the entire lens are deteriorated. On the contrary, the present exemplary embodiment does not cause such a deterioration.

Figure 6:
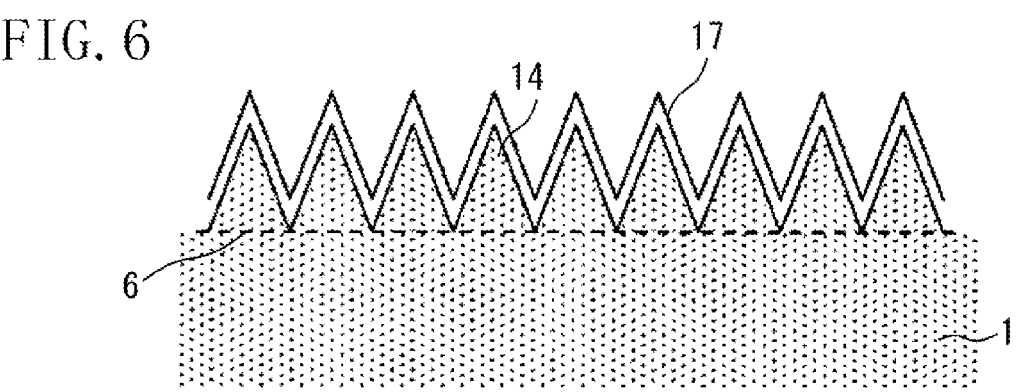
FIG. 6 is a schematic view illustrating an arrangement of a functional film having a fine concavo-convex structure with a protective layer.

FIG. 6 is a diagram illustrating an arrangement in which a layer (protective coating) 17 thinner than the height of a fine concavo-convex structure is applied onto the functional film 14 of the fine concavo-convex structure in the present exemplary embodiment.

In the arrangement illustrated in FIG. 6, the thin layer (protective layer) 17 having a film thickness of 10 nm or thinner is coated so as not to reduce characteristics as the functional film 14 on the surface, thereby improving the environment-resistant characteristics, such as preventing the infiltration of water.

In this arrangement, for example, if the arrangement illustrated in FIG. 9 is employed, a fine concavo-convex structure having low hardness may be broken and the protective coating 17 may be simultaneously removed. Thus, the environment-resistant characteristics may be deteriorated.

On the contrary, in the arrangement illustrated in FIG. 1, even if decentering adjustment is made, the edge portion 12 of the second surface 6 having the functional film 14 can be moved on the first surface 7, which faces the edge portion 12. Thus, the functional film 14 is not broken. Accordingly, according to the present exemplary embodiment, the effect using the functional film can be obtained on the entire surface.

It is useful that the film hardness of the functional film 14 according to the present exemplary embodiment has hardness of equal to or less than H specified in a scratch hardness standard in ISO/DIN 15184. If the film hardness is equal to or greater than H, as described above, the functional film may not broken so easily when a lens is incorporated.

The thin film layer 15 in the functional film 14 according to the present exemplary embodiment is configured with a film deposited with one or more layers by vacuum vapor deposition of an inorganic material, such as $TiO_2$, $SiO_2$, and $Al_2O_3$. Alternatively, the thin film layer 15 is configured with a multi-component layer filmed by performing spin coating or dip coating of a coating liquid, on the surface of a lens, including at least one type of compound selected from among the compounds of $SiO_2$, $TiO_2$, $ZrO_2$, and $ZnO_2$. Further, the fine structure portion 16 is configured by spin coating or dip coating of a solution, on the surface of a lens, containing aluminum, thereby forming a film, and performing immersion treatment of the film in hot water at approximately 80 degrees, thereby forming a fine concavo-convex structure. In this case, the film hardness of the functional film 14 is 6B.

Further, in an optical system according to the present exemplary embodiment, it is useful that an antireflection film, made by vapor deposition or the like, higher in film hardness than that of the functional film 14 is applied to the first surface 7 of the second lens 2 opposite the functional film 14. For example, an antireflection film having film hardness of equal to or greater than H can be applied.

An antireflection film made by vapor deposition is excellent in film hardness (hard). Thus, the surface of a lens is not damaged so easily. Further, it is useful that an oil repellent film (oil repellent treatment) is applied to the first surface 7. In this case, when decentering adjustment is performed, the edge portion 12 of the second surface 6 with the functional film 14 can be smoothly moved on the oil repellent film coated on the first surface 7. Therefore, the decentering adjustment can easily be performed.

From the view point of the optical characteristics, it is useful that the functional film 14 according to the present exemplary embodiment has a layer (fine structure portion) 16, on the outermost surface of the film, having a lower refractive index than that of the lens 1 or the thin film layer 15. Further, it is useful that the functional film 14 according to the present exemplary embodiment has a low refractive index such as 1.35 or lower.

As a common film material, the refractive index of a material of $MgF_2$ is approximately 1.38. Accordingly, a film having a refractive index of higher than 1.35 may reduce the effect as a functional film.

Further, a functional film in the present exemplary embodiment can have an antireflection function as well as spectral characteristics such as a dichroic film or an interference filter.

Furthermore, as a layer having a low refractive index, it is not limited to a production method and a structure, and a fine structure portion having various shapes as described above can be adopted.

Second Exemplary Embodiment

Figure 7:
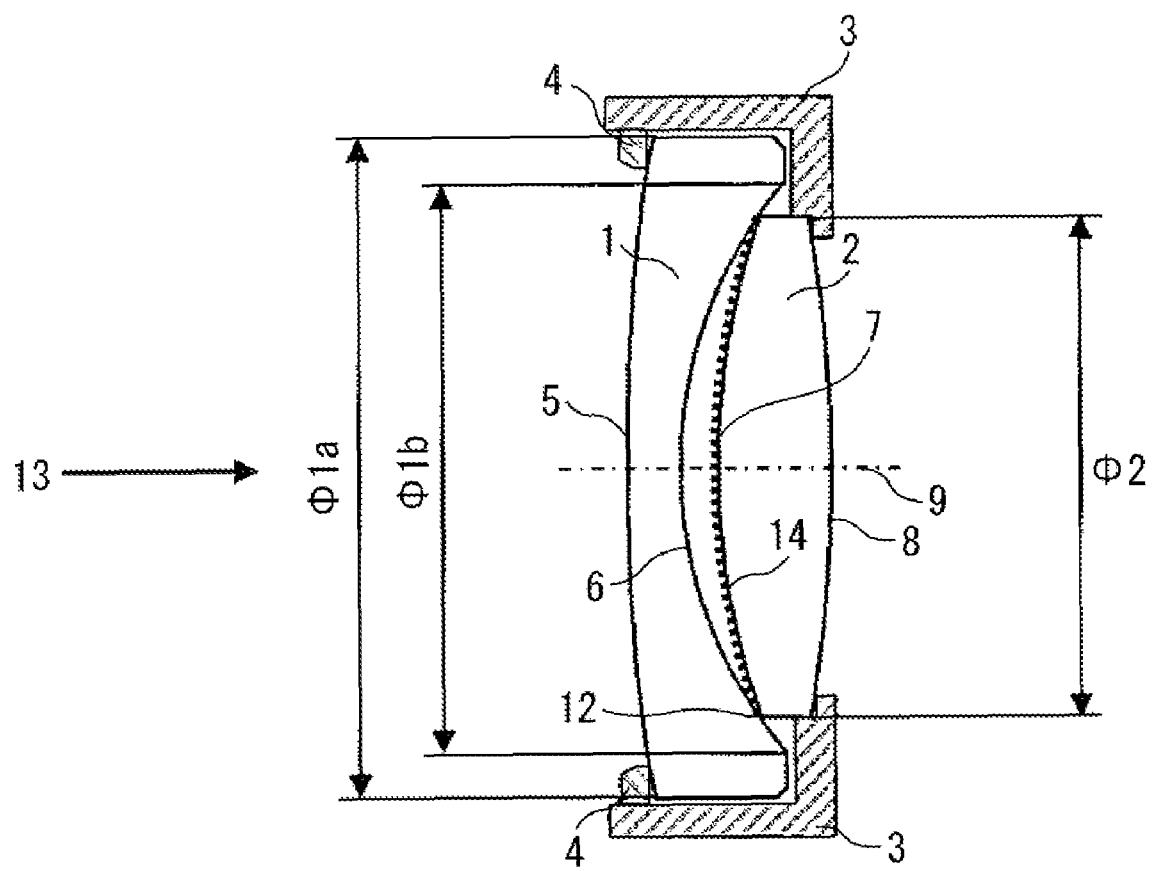
FIG. 7 is a cross-sectional view illustrating an arrangement of an optical system according to a second exemplary embodiment of the present invention.
Figure 8A:
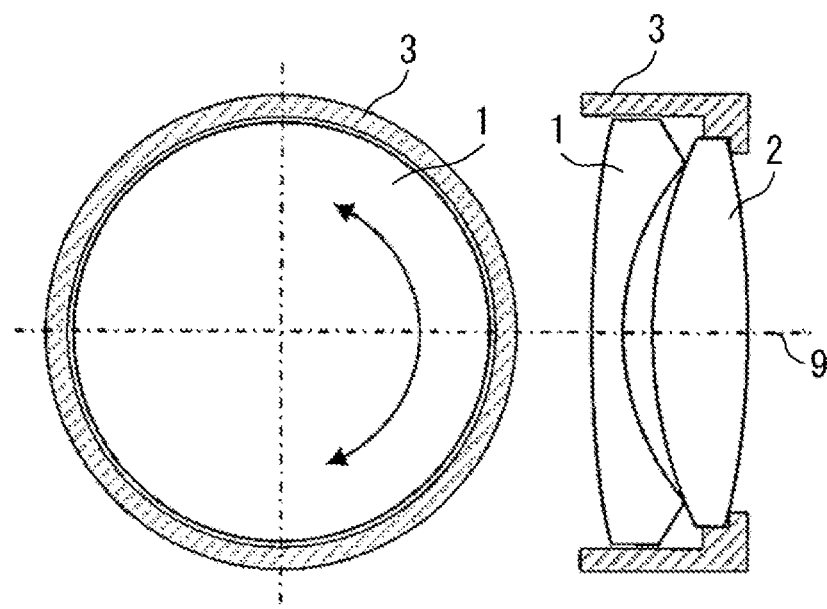
FIGS. 8A and 8B are cross-sectional views illustrating a decentering adjustment of a lens.
Figure 8B:
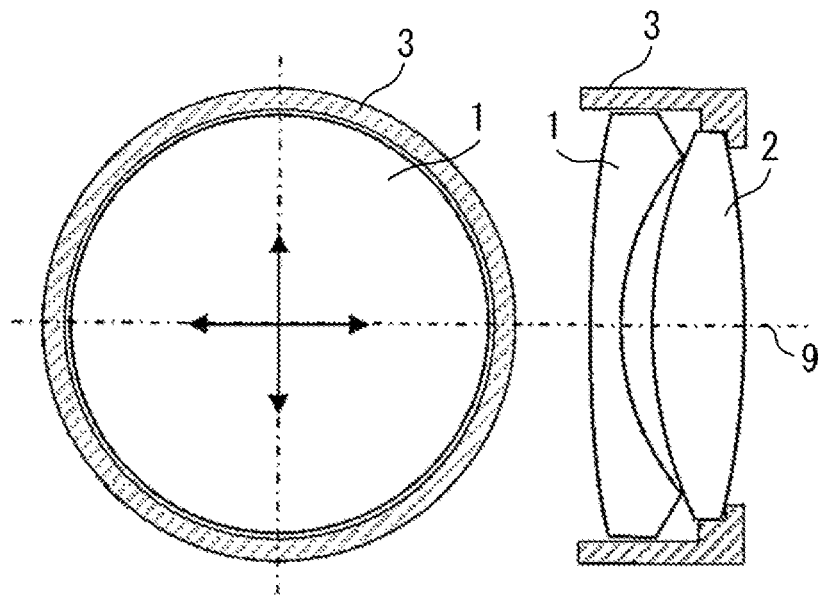

FIG. 7 is a diagram illustrating an arrangement of an optical system according to a second exemplary embodiment of the present invention. FIG. 7 has a similar lens arrangement to FIG. 1. The optical system according to the second exemplary embodiment includes a meniscus-shaped negative first lens 1 and a biconvex-shaped positive second lens 2.

In the second exemplary embodiment, the functional film 14 is formed on the convex-shaped first surface 7 of the second lens 2. Also, in this case, the internal diameter ($\Phi 1b$) of the second surface 6 of the first lens 1 is larger than the external diameter ($\Phi 2$) of the first surface 7, opposite the second surface 6, with the functional film 14. Thereby, marginal contact is achieved at the edge portion 12 of the first surface 7 with the functional film 14. Thus, similar to the first exemplary embodiment illustrated in FIG. 1, both lenses can easily be incorporated into the lens barrel 3 without breaking the functional film 14.

Thus, the optical system according to an exemplary embodiment of the present invention does not depend on the shape of a lens to which a functional film is applied. If the shape of a lens allows marginal contact, the optical system according to the exemplary embodiment is applied to any lens having different shapes.

Accordingly, according to an exemplary embodiment of the present invention, even if a film having low film hardness is applied to a lens, an optical system to allow marginal contact without breaking a film can be obtained. Then, this can provide a functional film having high-performance antireflection characteristics. Further, an optical system can be obtained which suppresses harmful reflected light, prevents ghost light, and thereby has excellent optical properties.

Furthermore, a functional film can be applied to the surface of marginal contact having high accuracy of incorporation. Thus, an optical system such as an imaging lens, which is required for a reduced size and an improved performance, can easily be obtained.

The optical system according to an exemplary embodiment of the present invention can be applied if the film hardness of a functional film applied to one surface of a lens to perform marginal contact is less than the hardness of a material of a lens opposite the surface with a functional film thereon. Further, the optical system can be applied if the film hardness of the functional film is less than the film hardness of a film (e.g., antireflection film) formed on the surface of a lens opposite the surface with the functional film thereon.

The optical system according to an exemplary embodiment of the present invention can be applied to optical systems for use in a wide wavelength range in an optical apparatus, such as an imaging lens for a video camera, a finder optical system, an image scanner of office equipment, a reader lens of a digital copying machine, and a projection optical system of a projector.

Further, the optical system according to an exemplary embodiment of the present invention can also be applied to an observation optical system of an optical apparatus, such as binoculars, a terrestrial telescope, and an astronomical observation telescope.

When the optical system according to an exemplary embodiment is used for these optical apparatuses, an optical system to perform excellent antireflection over a wide wavelength range can be obtained.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-306835 filed Nov. 28, 2007, which is hereby incorporated by reference herein in its entirety.

What is claimed is:

1. An optical system comprising:
   a first lens with a functional film having film hardness of equal to or less than H formed on at least one surface thereof; and
   a second lens located opposite the surface with the functional film of the first lens and having a diameter larger than that of the surface with the functional film,
   wherein the first lens and the second lens are in marginal contact with each other.

2. The optical system according to claim 1, wherein antireflection coating is formed on a surface of the second lens opposite the surface with the functional film.

3. The optical system according to claim 2, wherein oil repellent treatment is applied to the surface of the antireflection coating.

4. The optical system according to claim 1, wherein the functional film includes a layer made of a material having a refractive index of 1.35 or lower than 1.35 on the outermost surface thereof.

5. The optical system according to claim 1, wherein the functional film has an antireflection function in a visible light range.

6. The optical system according to claim 1, wherein the functional film has a fine structure portion on the outermost surface thereof.

7. The optical system according to claim 6, wherein the fine structure portion has a fine relief shape on the outermost surface.

8. The optical system according to claim 7, wherein the functional film is made by transferring the fine relief shape to a lens surface by injection molding using a mold having the fine relief shape.

9. The optical system according to claim 7, wherein the functional film is formed by stacking a lens on a mold having the fine relief shape thereon via a precursor liquid layer of a radiation curable resin, then curing the precursor liquid layer by irradiating radioactive rays thereto, and thereafter releasing the lens from the mold.

10. The optical system according to claim 7, wherein the functional film has a fine structure layer made by performing hot water treatment on a multi-component layer filmed by performing spin coating or dip coating of a coating liquid containing at least one type of compound selected from among compounds of zirconium, silicon, titanium and zinc, and a compound of aluminum on a lens surface on outermost surface thereof.

11. The optical system according to claim 7, wherein a protective coating having a thickness of 10 nm or less is formed on the outermost surface of the fine structure portion.

12. The optical system according to claim 6, wherein the fine structure portion has fine cavities or particles.

13. The optical system according to claim 12, wherein the functional film is made by forming a layer with arrangement of the fine particles on the outermost surface through performing spin coating or dip coating of a liquid including a binder in which fine particles having a size of 550 nm or less are dispersed, on a lens surface.

14. The optical system according to claim 12, wherein the functional film has a layer formed with cavities on the outermost surface made by coating a resin, in which a different medium is dispersed, on a lens surface to remove the medium from the resin by a treatment.

15. The optical system according to claim 6, wherein the fine structure portion includes a fine structure of 200 nm or less.

16. The optical system according to claim 1, wherein the functional film has a porous layer of silica aerogel on the outermost surface thereof.

17. The optical system according to claim 1, further comprising a lens barrel which accommodates the first lens and the second lens, wherein the lens barrel has such a shape that the first lens is incorporated into the lens barrel from a direction of a surface opposite the surface with the functional film.

18. The optical system according to claim 1, wherein an antireflection coating having film hardness of equal to or greater than H is formed on a surface of the second lens opposite the surface with the functional film.

19. An optical system comprising:
   a first lens with a functional film formed on at least one surface thereof; and
   a second lens located opposite the surface with the functional film of the first lens and having a diameter larger than that of the surface with the functional film,
   wherein the first lens and the second lens are in marginal contact with each other, and
   wherein film hardness of the functional film is less than hardness of a material of the second lens or film hardness of a film formed on a surface of the second lens opposite the surface with the functional film.

20. An optical apparatus comprising:
   an optical system including,
      a first lens with a functional film having film hardness of equal to or less than H formed on at least one surface thereof; and
      a second lens located opposite the surface with the functional film of the first lens and having a diameter larger than that of the surface with the functional film,
      wherein the first lens and the second lens are in marginal contact with each other.

* * * * *